Patented Apr. 9, 1935

1,996,746

UNITED STATES PATENT OFFICE 1,996,746

PREPARATION OF ARYL MAGNESIUM CHLORIDE

Edgar C. Britton and Harold R. Slagh, Midland, Mich., assignors to The Dow Chemical Company, Midland, Mich., a corporation of Michigan No Drawing. Application March 8, 1932, Serial No. 597,629

6 Claims. (Cl. 260—168)

The present invention concerns an improved method of preparing aryl magnesium chlorides having the general formula R—Mg—Cl wherein R represents an aromatic residue of the benzene series.

Aryl magnesium iodides and the corresponding bromides are used extensively for the synthesis, on laboratory scale, of a wide variety of aromatic compounds, the reactions involved being of the well known "Grignard" type. The relatively high cost of the iodo- and bromo- aromatic compounds from which the abovementioned "Grignard" reagents are prepared has prohibited extended employment of such reagents for the synthesis of aromatic compounds on a commercial scale. Aromatic chlorides, on the other hand, are relatively inexpensive and, from a cost viewpoint, would be well adapted for commercial use in the manner described above. Aromatic chlorides, however, exhibit but slight reactivity toward magnesium under the conditions generally employed in preparing "Grignard" reagents, hence their employment for such purpose, even on laboratory scale, has been considered non-feasible up to the present time.

We have now found that an aryl magnesium chloride of the benzene series may be prepared in good yield, at low cost, and in a brief period of time through heating a chloro-benzene compound with metallic magnesium under superatmospheric pressure, i. e. in a closed reactor, and at a temperature above about 130° C. and below the temperature at which appreciable decomposition occurs. The present invention, then, consists in an improved method of preparing an aryl magnesium chloride having the general formula R—Mg—Cl wherein R represents an aromatic residue of the benzene series, said method being hereinafter fully described and particularly pointed out in the claims.

The following description sets forth in detail but one of the various ways in which the principle of our invention may be practiced. It is to be understood, however, that the detailed description is purely illustrative and is not to be construed as a limitation on the invention.

In preparing an aryl magnesium chloride of the class previously mentioned, we heat a chloro-benzene compound with metallic magnesium under superatmospheric pressure and at a temperature preferably between about 150° C. and about 210° C. The reaction may usually be substantially completed through heating in such manner for a period of one hour, though longer heating may sometimes be required. A catalyst, such as alkyl iodide, alkyl bromide, alkyl magnesium halide, copper, copper compound, ferric chloride, etc., which is capable of promoting formation of a Grignard reagent by usual procedure, may be employed during the heating operation but the reaction will proceed smoothly in the absence of such catalyst. An organic solvent such as ether, benzene, isoamyl ether, etc., may be mixed with the aryl chloride prior to reacting the latter with magnesium, but we have found that the reaction will proceed smoothly if no solvent, other than the aryl chloride itself, is employed.

The aryl magnesium chloride, formed as a product in our process, is but sparingly soluble in the aryl chloride itself, and may be filtered or otherwise removed therefrom in solid form and may be redissolved in a suitable solvent such as ether, isoamyl ether, an ether-benzene solution, an isoamyl ether-benzene solution, or in any other unreactive organic solvent capable of dissolving the same and be employed as a reactant in forming other aromatic compounds through the usual Grignard reactions. In practice, however, we prefer to employ a slight excess of the aryl chloride over that quantity required to combine with the magnesium used to form an aryl magnesium chloride, and, after the latter is formed, to add to the reaction mixture, a mixture of ether and benzene in quantity sufficient to dissolve an appreciable portion of the aryl magnesium chloride product. The solution or mixture, so formed, may then be employed directly as an agent in the usual Grignard reactions.

During the preparation of phenyl magnesium chloride according to the general method described above, a relatively small quantity of diphenyl is sometimes formed, along with the desired reaction product, phenyl magnesium chloride.

Other chloro-benzene compounds such as monochloro - toluene, monochloro - xylene, 2-chloro-ethyl-benzene, ortho-dichloro-benzene, monochloro-phenetole, monochloro-anisol, etc., may be employed as reactants for the formation of the corresponding aryl magnesium chloride as herein described. In the case of ortho-dichlorobenzene, but one of the chlorine substituents appears to be reactive toward magnesium.

Although, as previously pointed out, we may react a chloro-benzene compound with magnesium under superatmospheric pressure and at any temperature above about 130° C. and below that temperature at which decomposition occurs, in practice we prefer to carry the reaction out at a temperature between about 150° and about 210° C. When operating at a temperature substantially lower than 150° C., the reaction tends to become sluggish. When operating at a temperature substantially higher than 210° C., an appreciable quantity of diphenyl may be formed.

As previously pointed out, we prefer to employ an excess of the chloro-benzene compound when practicing our invention. We may, however, employ the chloro-benzene compound and magnesium in equimolecular quantities or we may use excess magnesium. In such case the product may be obtained directly in solid form and subsequently be dissolved in a suitable organic solvent, such as those previously mentioned, and be employed as a reactant for the formation of other organic compounds by means of the well known "Grignard" reaction.

Throughout the specification and in the claims, the expression "chloro-benzene compound" is employed as referring to a compound selected from the class consisting of chloro-benzene and substituted chloro-benzenes, e. g. monochloro-toluene, mono-chloro-xylene, 2-chloro-ethyl-benzene, ortho-dichloro-benzene, monochloro-phenetole, monochloro-anisol, etc., which compound does not contain a group or radical which is as reactive toward magnesium as is a chlorine substituent in said compound.

Other modes of applying the principle of our invention may be employed instead of those explained, change being made as regards the method herein disclosed, providing the means stated by any of the following claims, or the equivalent of such stated means be employed.

We therefore particularly point out and distinctly claim as our invention:—

1. The method of making an aryl magnesium chloride of the benzene series which comprises reacting a chloro-benzene compound with metallic magnesium under superatmospheric pressure and at a temperature above about 130° C. and below the temperature at which appreciable decomposition of organic components of the reaction mixture occurs.

2. The method of making an aryl magnesium chloride of the benzene series which comprises reacting a chloro-benzene compound with metallic magnesium in the presence of a catalyst, capable of promoting formation of a Grignard reagent under superatmospheric pressure, and at a temperature between about 150° and about 210° C.

3. The method of making phenyl magnesium chloride which comprises reacting monochlorobenzene with metallic magnesium under superatmospheric pressure and at a temperature above about 130° C. and below the temperature at which material decomposition of organic components of the reaction mixture occurs.

4. The method of making phenyl magnesium chloride which comprises reacting monochlorobenzene with metallic magnesium in the presence of a catalyst capable of promoting formation of a Grignard reagent, under superatmospheric pressure, and at a temperature between about 150° and about 210° C.

5. The method of making an aryl magnesium chloride of the benzene series which comprises heating a chloro-benzene compound with metallic magnesium in a closed reactor to a reaction temperature between about 150° and about 210° C.

6. The method of making phenyl magnesium chloride which comprises heating monochlorobenzene with metallic magnesium in a closed reactor to a reaction temperature between about 150° and about 210° C.

EDGAR C. BRITTON.
HAROLD R. SLAGH.